Patented Aug. 20, 1940

2,212,478

UNITED STATES PATENT OFFICE 2,212,478

ALKYL CATECHOLS

Ellis Miller, Philadelphia, Pa., assignor to Sharp & Dohme, Incorporated, Philadelphia, Pa., a corporation of Maryland No Drawing. Application December 20, 1937, Serial No. 180,825

12 Claims. (Cl. 260—624)

This invention relates to a new and improved process for the production of alkyl catechols, and it includes not only this new process, but also hexyl catechol as produced thereby in a crystalline state, as distinguished from the liquid hexyl catechol heretofore known.

Alkyl catechols have been produced by esterifying catechol with lower fatty acids, rearranging the resulting esters to form the corresponding alkyl catechol ketones, and reducing these ketones to form the alkyl catechols. Another method for the production of these compounds involves the formation of guaiacol esters of the lower fatty acids, with rearrangement and simultaneous demethylation of the guaiacol esters to form the alkyl catechol ketones, and reduction of the ketones.

In accordance with the present invention, alkyl catechols are prepared from catechol and the acyl halides of fatty acids, particularly lower fatty acids having from 3 to 8 carbon atoms, by direct formation of the alkyl catechol ketones from the acyl halides and the catechol and subsequent reduction of the ketone. By this new process, the intermediate steps of forming the esters of catechol and rearranging the esters to form the ketones are eliminated. Thus the process is greatly simplified, and the desired final products are produced in greatly increased yields and with unexpected purity, hexyl catechol, for example, being produced as a new crystalline product of unexpected purity instead of as a liquid product.

In general, the process of the present invention involves reacting catechol with an anhydrous halide adapted to react with the catechol to split off the corresponding hydrogen halide and form a complex having the phenolic hydroxyls blocked, this reaction being carried out in an inert solvent, advantageously carbon bisulfide, and then reacting the complex so obtained with the acyl halide of a fatty acid, such as the acid chloride, with direct introduction of the alkyl carbonyl group into the benzene ring structure of the catechol, without intermediate formation and rearrangement of the ester. The ketones so produced are hydrolyzed to split the complex and form the corresponding alkyl catechol ketones, which may be purified by distillation or in other ways, and subsequently reduced, as by catalytic hydrogenation, to form the corresponding alkyl catechols.

A number of anhydrous halides may be used in the production of the intermediate complexes, including aluminum chloride, ferric chloride, antimony chloride, tin chloride, mercuric chloride, phosphorus tribromide, boron trifluoride and other halides of like nature. It is important that the halides be anhydrous, and that the formation of the complexes be carried out in the absence of water, as the complexes hydrolyze readily.

The invention will be further illustrated by the following specific example, but it is not limited thereto.

*Example.*—Into a reaction vessel equipped with an agitator, a reflux condenser and a dropping funnel are placed 110 parts of catechol (1 mole), 399 parts of aluminum chloride (3 moles) and 700 parts of carbon bisulfide. The mixture is agitated for 15 minutes at room temperature and then is agitated for about one hour at refluxing temperature. About 160 parts of caproyl chloride are then added slowly over a period of about one-half hour at room temperature, and after this addition is complete, agitation is continued at room temperature for about 15 minutes, or until HCl almost stops coming over, after which the mixture is heated at refluxing temperature for about one hour. Most of the carbon bisulfide is then distilled off and the product is allowed to stand overnight. The contents are then heated to about 135 to 140° C. for eight hours, allowed to cool and again left to stand overnight. The resulting solid mass is broken up and dissolved by adding 1000 parts of 1:1 HCl solution cautiously and with agitation. If necessary, additional hot water may be added to dissolve any inorganic salt that may be present, with refluxing for a short period to complete solution of any lumps. The product so obtained is extracted with 300 parts n-butanol, and the extract is washed three times with water, these washings being extracted with 50 parts of n-butanol, the extract so obtained being washed with water. The n-butanol extracts are combined and the butanol is distilled off at atmospheric pressure. The residue is distilled at 4 mm. pressure and the fraction boiling between 200–220° C. is collected and recrystallized from toluene. It is caproyl catechol, m. p. 91° C.

A catalyst is prepared by agitating charcoal in an aqueous solution of palladium chloride in an atmosphere of hydrogen for several hours in the proportions of about 1 part of palladium chloride to 3 to 4 parts of charcoal, with subsequent washing of the catalyst with water and anhydrous alcohol.

121 parts of caproyl catechol are introduced into a suspension of the catalyst so prepared in 1000 parts of anhydrous alcohol, and the resulting mixture is shaken in the presence of hydrogen until absorption of hydrogen substantially ceases. The catalyst is then removed by filtration and the alcohol removed from the filtrate by distillation at atmospheric pressure. The residue is distilled at 8 mm. pressure and the fraction boiling between 170–175° C. is collected. It crystallizes when chilled in the refrigerator.

10 parts of the chilled crystalline material are dissolved in 30 parts of solvent naphtha, the solution is cooled with a salt and ice mixture, filtered through a cooled funnel and the crystals formed are washed with cooled solvent naphtha. The crystals are then transferred quickly to a cooled brown bottle immersed in an ice bath and evacuated to 6 mm. pressure for one and one-half hours. The hexyl catechol is obtained as white crystals, m. p. 18–19° C., in very high yields.

It is to be understood that other anhydrous halides than aluminum chloride, including those referred to above, may be used to block the phenolic hydroxyls so that the reaction with the acyl halide will result in the introduction of the alkyl carbonyl group into the ring structure without formation of esters, such other halides being used in the same manner as the aluminum chloride.

The alkyl catechols may be produced from the ketones by other reduction methods than the catalytic hydrogenation described, such as by Clemmensen's method, but the yields obtained when such processes are used are not as good as those obtained by catalytic reduction.

Other acyl halides than caproyl chloride may, of course, be used, with the production of other corresponding alkyl catechols. The new process has particular advantages for the production of alkyl catechols from catechol and the acyl chlorides of fatty acids having from 3 to 8 carbon atoms.

I claim:

1. In the method of preparing primary alkyl catechols comprising the preparation of the corresponding alkyl catechol ketone and subsequent reduction thereof to form the alkyl catechol, the combination of steps which comprises blocking the phenolic hydroxyls of catechol by reaction with an anhydrous inorganic halide, capable of reacting with and of blocking the reactivity of the phenolic hydroxyls, to form a catechol-halide complex, reacting said complex with an acyl halide of a fatty acid, and hydrolyzing the resulting ketone to decompose the complex formed at the original hydroxyl groups and to form the alkyl catechol ketone.

2. In the method of preparing primary alkyl catechols comprising the preparation of the corresponding alkyl catechol ketone and subsequent reduction thereof to form the alkyl catechol, the combination of steps which comprises blocking the phenolic hydroxyls of catechol by reaction with an anhydrous inorganic halide, capable of reacting with and of blocking the reactivity of the phenolic hydroxyls, to form a catechol-halide complex, reacting said complex with an acyl halide of a fatty acid, hydrolyzing the resulting ketone to decompose the complex formed at the original hydroxyl groups and to form the alkyl catechol ketone, and separating said alkyl catechol ketone.

3. In the method of preparing primary alkyl catechols comprising the preparation of the corresponding alkyl catechol ketone and subsequent reduction thereof to form the alkyl catechol, the combination of steps which comprises blocking the phenolic hydroxyls of catechol by reaction with an anhydrous halide from the group consisting of aluminum chloride, ferric chloride, antimony chloride, tin chloride, zinc chloride, mercuric chloride, phosphorus tribromide and boron trifluoride to form a catechol-halide complex, reacting said complex with an acyl halide of a fatty acid, and hydrolyzing the resulting ketone to decompose the complex formed at the original hydroxyl groups and to form the alkyl catechol ketone.

4. In the method of preparing primary alkyl catechols comprising the preparation of the corresponding alkyl catechol ketone and subsequent reduction thereof to form the alkyl catechol, the combination of steps which comprises blocking the phenolic hydroxyls of catechol by reaction with an anhydrous inorganic halide, capable of reacting with and of blocking the reactivity of the phenolic hydroxyls, in an inert solvent, to form a catechol-halide complex, reacting said complex with an acyl halide of a fatty acid, hydrolyzing the resulting ketone to decompose the complex formed at the original hydroxyl groups and to form the alkyl catechol ketone, and separating said alkyl catechol ketone.

5. In the method of preparing primary alkyl catechols comprising the preparation of the corresponding alkyl catechol ketone and subsequent reduction thereof to form the alkyl catechol, the combination of steps which comprises forming a reaction product of catechol and anhydrous aluminum chloride, reacting said reaction product with an acyl halide of a fatty acid, hydrolyzing the resulting ketone to decompose the complex formed at the original hydroxyl groups and to form the alkyl catechol ketone, and separating said alkyl catechol ketone.

6. In the method of preparing primary alkyl catechols comprising the preparation of the corresponding alkyl catechol ketone and subsequent reduction thereof to form the alkyl catechol, the combination of steps which comprises forming a reaction product of catechol and anhydrous aluminum chloride, reacting said reaction product with an acyl chloride of a fatty acid, hydrolyzing the resulting ketone to decompose the complex formed at the original hydroxyl groups and to form the alkyl catechol ketone, and separating said alkyl catechol ketone.

7. In the method of preparing primary alkyl catechols comprising the preparation of the corresponding alkyl catechol ketone and subsequent reduction thereof to form the alkyl catechol, the combination of steps which comprises forming a reaction product of catechol and anhydrous aluminum chloride, in an inert solvent, reacting said reaction product with an acyl chloride of a fatty acid, hydrolyzing the resulting ketone to decompose the complex formed at the original hydroxyl groups and to form the alkyl catechol ketone, and separating said alkyl catechol ketone.

8. In the method of preparing primary alkyl catechols comprising the preparation of the corresponding alkyl catechol ketone and subsequent reduction thereof to form the alkyl catechol, the combination of steps which comprises forming a reaction product of catechol and anhydrous aluminum chloride, in carbon bisulfide, reacting said reaction product with an acyl chloride of a fatty acid, hydrolyzing the resulting ketone to decompose the complex formed at the original hydroxyl groups and to form the alkyl catechol ketone, and separating said alkyl catechol ketone.

9. In the method of preparing primary hexyl catechol comprising the preparation of corresponding caproyl catechol and subsequent reduction thereof to form the hexyl catechol, the combination of steps which comprises forming a reaction product of catechol and anhydrous aluminum chloride, reacting caproyl chloride with the product so obtained, hydrolyzing the resulting ketone to decompose the complex formed at the original hydroxyl groups and to form caproyl catechol, and separating the caproyl catechol.

10. In the method of preparing normal primary alkyl catechols comprising the preparation of the corresponding alkyl catechol ketone and subsequent reduction thereof to form the alkyl catechol, the combination of steps which comprises blocking the phenolic hydroxyls of catechol by reaction with an anhydrous inorganic halide, capable of reacting with and of blocking the reactivity of the phenolic hydroxyls, to form a catechol-halide complex, reacting said complex with an acyl halide of a fatty acid, hydrolyzing the resulting ketone to decompose the complex formed at the original hydroxyl groups and to form the alkyl catechol ketone, and separating said alkyl catechol ketone.

11. In the method of preparing normal primary alkyl catechols comprising the preparation of the corresponding alkyl catechol ketone and subsequent reduction thereof to form the alkyl catechol, the combination of steps which comprises forming a reaction product of catechol and anhydrous aluminum chloride, reacting said reaction product with an acyl halide of a fatty acid, hydrolyzing the resulting ketone to decompose the complex formed at the original hydroxyl groups and to form the alkyl catechol ketone, and separating said alkyl catechol ketone.

12. In the method of preparing normal primary alkyl catechols comprising the preparation of the corresponding alkyl catechol ketone and subsequent reduction thereof to form the alkyl catechol, the combination of steps which comprises forming a reaction product of catechol and anhydrous aluminum chloride, reacting said reaction product with an acyl chloride of a fatty acid, hydrolyzing the resulting ketone to decompose the complex formed at the original hydroxyl groups and to form the alkyl catechol ketone, and separating said alkyl catechol ketone.

ELLIS MILLER.